United States Patent
Ikuma et al.

(10) Patent No.: US 10,116,887 B2
(45) Date of Patent: Oct. 30, 2018

(54) SOLID-STATE IMAGING DEVICE AND CAMERA

(71) Applicant: PANASONIC INTELLECTUAL PROPERTY MANAGEMENT CO., LTD., Osaka (JP)

(72) Inventors: Makoto Ikuma, Kyoto (JP); Masaru Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/636,165

(22) Filed: Jun. 28, 2017

(65) Prior Publication Data

US 2017/0302870 A1 Oct. 19, 2017

Related U.S. Application Data

(63) Continuation of application No. PCT/JP2016/000318, filed on Jan. 22, 2016.

(30) Foreign Application Priority Data

Jan. 28, 2015 (JP) ................................ 2015-014341

(51) Int. Cl.
*H04N 5/225* (2006.01)
*H04N 3/14* (2006.01)
(Continued)

(52) U.S. Cl.
CPC ......... *H04N 5/3658* (2013.01); *H04N 5/3577* (2013.01); *H04N 5/37457* (2013.01)

(58) Field of Classification Search
CPC ...... H04N 5/357; H04N 5/335; H04N 5/3658; H04N 5/378; H04N 5/3577;
(Continued)

(56) References Cited

U.S. PATENT DOCUMENTS

2008/0111905 A1 5/2008 Toyama et al.
2008/0158401 A1* 7/2008 Ishimoto ................ H04N 5/335
348/308

(Continued)

FOREIGN PATENT DOCUMENTS

JP 2007-281540 A 10/2007
JP 2009-253559 A 10/2009
(Continued)

OTHER PUBLICATIONS

International Search Report and Written Opinion issued in International Patent Application No. PCT/JP2016/000318, dated Mar. 15, 2016; with partial English translation.

*Primary Examiner* — Chia-Wei A Chen
(74) *Attorney, Agent, or Firm* — McDermott Will & Emery LLP

(57) ABSTRACT

A solid-state imaging device includes: a plurality of pixel circuits arranged in rows and columns; a plurality of unit power supply circuits that generate a second power supply voltage from a first power supply voltage based on a reference voltage and supply the second power supply voltage to amplifier transistors provided in the plurality of pixel circuits; and a regulator circuit that generates the reference voltage that is constant. Each of the unit power supply circuits is provided for a corresponding one of the columns of the plurality of pixel circuits or for a corresponding one of the pixel circuits, and supplies the second power supply voltage to the amplifier transistors in the pixel circuits that belong to the corresponding one of the columns or to the amplifier transistor in the corresponding one of the pixel circuits.

7 Claims, 10 Drawing Sheets

(51) Int. Cl.
*H04N 5/335* (2011.01)
*H04N 5/365* (2011.01)
*H04N 5/357* (2011.01)
*H04N 5/3745* (2011.01)

(58) Field of Classification Search
CPC ............ H04N 5/23241; H04N 5/3698; H04N 1/00885; G03B 2217/007; G03B 7/26; G06F 1/3203; G06F 1/325; G09B 9/305; H01M 10/623; H02M 3/00; H02M 7/00
See application file for complete search history.

(56) References Cited

U.S. PATENT DOCUMENTS

| | | | |
|---|---|---|---|
| 2009/0251576 A1* | 10/2009 | Hattori | H04N 5/335 348/294 |
| 2010/0012993 A1* | 1/2010 | Yamashita | H04N 5/3741 257/292 |
| 2010/0238336 A1* | 9/2010 | Okamoto | H04N 5/357 348/308 |
| 2010/0253772 A1 | 10/2010 | Toyama et al. | |
| 2011/0204977 A1* | 8/2011 | Kato | H04N 5/3745 330/252 |
| 2013/0063637 A1 | 3/2013 | Ebihara et al. | |
| 2013/0070133 A1* | 3/2013 | Takazawa | H04N 5/335 348/294 |
| 2014/0160331 A1 | 6/2014 | Murakami et al. | |
| 2015/0341581 A1* | 11/2015 | Saito | H04N 5/378 250/208.1 |
| 2015/0341582 A1* | 11/2015 | Sakaguchi | H01L 27/14634 348/301 |
| 2015/0381866 A1* | 12/2015 | Ono | H04N 5/2256 348/68 |
| 2016/0014363 A1* | 1/2016 | Kito | H04N 5/378 348/308 |
| 2016/0191825 A1* | 6/2016 | Sato | H04N 5/363 348/250 |
| 2017/0171488 A1* | 6/2017 | Oike | H04N 5/378 |
| 2018/0048838 A1* | 2/2018 | Nakamizo | H04N 5/3698 |
| 2018/0114497 A1* | 4/2018 | Tan | G09G 3/3651 |
| 2018/0167571 A1* | 6/2018 | Mabuchi | H04N 5/3698 |

FOREIGN PATENT DOCUMENTS

| | | |
|---|---|---|
| JP | 2013-51527 A | 3/2013 |
| JP | 2013-062611 A | 4/2013 |
| WO | 2011/104781 A1 | 9/2011 |
| WO | 2013/031097 A1 | 3/2013 |
| WO | 2014/104781 A1 | 7/2014 |
| WO | 2014/156028 A1 | 10/2014 |

\* cited by examiner

SOLID-STATE IMAGING DEVICE AND CAMERA

CROSS REFERENCE TO RELATED APPLICATIONS

This application is a U.S. continuation application of PCT International Patent Application Number PCT/JP2016/000318 filed on Jan. 22, 2016, claiming the benefit of priority of Japanese Patent Application Number 2015-014341 filed on Jan. 28, 2015, the entire contents of which are hereby incorporated by reference.

BACKGROUND

1. Technical Field

The present disclosure relates to a solid-state imaging device and a camera.

2. Description of the Related Art

In a conventional CMOS solid-state imaging device including a column-parallel-type AD converter, when comparators included in AD converters that are each provided for each column are inverted at the same time, power supply line voltage drops significantly, which poses a problem as noise. To address this problem, for example, Japanese Unexamined Patent Application Publication No. 2007-281540 (hereinafter referred to as PTL 1) discloses an imaging device in which through operation of a capacitor connected between a signal line provided in each comparator and a power supply line, circuit noise caused by variation in the potential of the power supply line is reduced.

However, the capacitor disclosed in PTL 1 is ineffective against disturbance noise such as power supply noise. That is, in a CMOS solid-state imaging device, if externally supplied pixel power itself has noise, the noise may be introduced into readout signals from the pixels. To address this, Japanese Unexamined Patent Application Publication No. 2013-62611 (hereinafter referred to as PTL 2) discloses a solid-state imaging device including a pixel power supply circuit that generates a pixel power supply voltage by attenuating noise so that the noise in the power supply voltage is not transmitted to a pixel signal.

Also, in a CMOS image sensor, if an externally supplied power supply voltage is directly input into each pixel and a vertical drive circuit, horizontal line noise occurs due to the influence of noise superimposed on the power supply voltage. To address this, Japanese Unexamined Patent Application Publication No. 2009-253559 (hereinafter referred to as PTL 3) discloses a solid-state imaging device including a pixel power supply regulator that generates a pixel power supply voltage that is supplied to each of the pixels in a pixel array by stepping down an external power supply voltage. The pixel power supply regulator includes a driver transistor that supplies a pixel power supply voltage from the external power supply voltage, and the driver transistor is configured to operate in a saturated state. This prevents the influence of noise from affecting the output side of the driver transistor even if noise is superimposed on the external power supply voltage.

With the background art described above, however, when a high level pixel signals are output from the pixels, or when the voltage varies due to the operation of the AD converter, for example, noise may occur in the vertical signal line, which causes a problem in that the noise sneaks into other columns, resulting in the occurrence of an image quality degradation (for example, an image quality degradation due to horizontal line noise).

The present disclosure provides a solid-state imaging device and a camera that reduce an image quality degradation caused by a power supply voltage including external noise being supplied from the outside to a power supply line that is connected to the pixels, as well as an image quality degradation caused by noise generated inside sneaking into other columns.

SUMMARY

In order to solve the problems described above, a solid-state imaging device according to the present disclosure includes: a plurality of pixel circuits arranged in rows and columns; a plurality of unit power supply circuits that generate a second power supply voltage from a first power supply voltage based on a reference voltage and supply the second power supply voltage to amplifier transistors provided in the plurality of pixel circuits; and a regulator circuit that generates the reference voltage that is constant, and each of the plurality of unit power supply circuits is provided for a corresponding one of the columns of the plurality of pixel circuits or for a corresponding one of the pixel circuits, and supplies the second power supply voltage to the amplifier transistors in the pixel circuits that belong to the corresponding one of the columns or to the amplifier transistor in the corresponding one of the pixel circuits.

The solid-state imaging device and the camera according to the present disclosure can reduce an image quality degradation caused by external noise in a power supply line connected to pixel circuits, as well as an image quality degradation caused by noise sneaking between columns.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, a solid-state imaging device according to an embodiment for carrying out the present disclosure will be described with reference to the drawings.

It is to be noted, however, that an excessively detailed description may be omitted.

For example, a detailed description of already well-known matters and an overlapping description of substantially the same structural elements may be omitted. This is to avoid the following description from being unnecessarily lengthy and to facilitate the understanding of a person having ordinary skill in the art. The accompanying drawings and the following description are presented for a person having ordinary skill in the art to sufficiently understand the present disclosure, and thus are not intended to limit the subject matter of the claims.

First, an overview of a solid-state imaging device according to the present disclosure will be described.

The solid-state imaging device according to the present disclosure includes a plurality of unit power supply circuits that generate a second power supply voltage from a first power supply voltage. Each unit power supply circuit is provided for each column of a plurality of pixel circuits (unit cell or unit pixel cell) or for each pixel circuit, and supplies the second power supply voltage to amplifier transistors provided in the pixel circuits belonging to the corresponding column or an amplifier transistor provided in the corresponding pixel circuit.

With this configuration, the solid-state imaging device reduces an image quality degradation caused by external noise in a power supply line connected to the pixel circuits, as well as an image quality degradation caused by noise sneaking between columns.

Embodiment 1

In Embodiment 1, a solid-state imaging device in which a unit power supply circuit is provided for each column of pixel circuits, rather than for each pixel circuit, will be described.

Configuration Example of Solid-State Imaging Device

Figure 1:
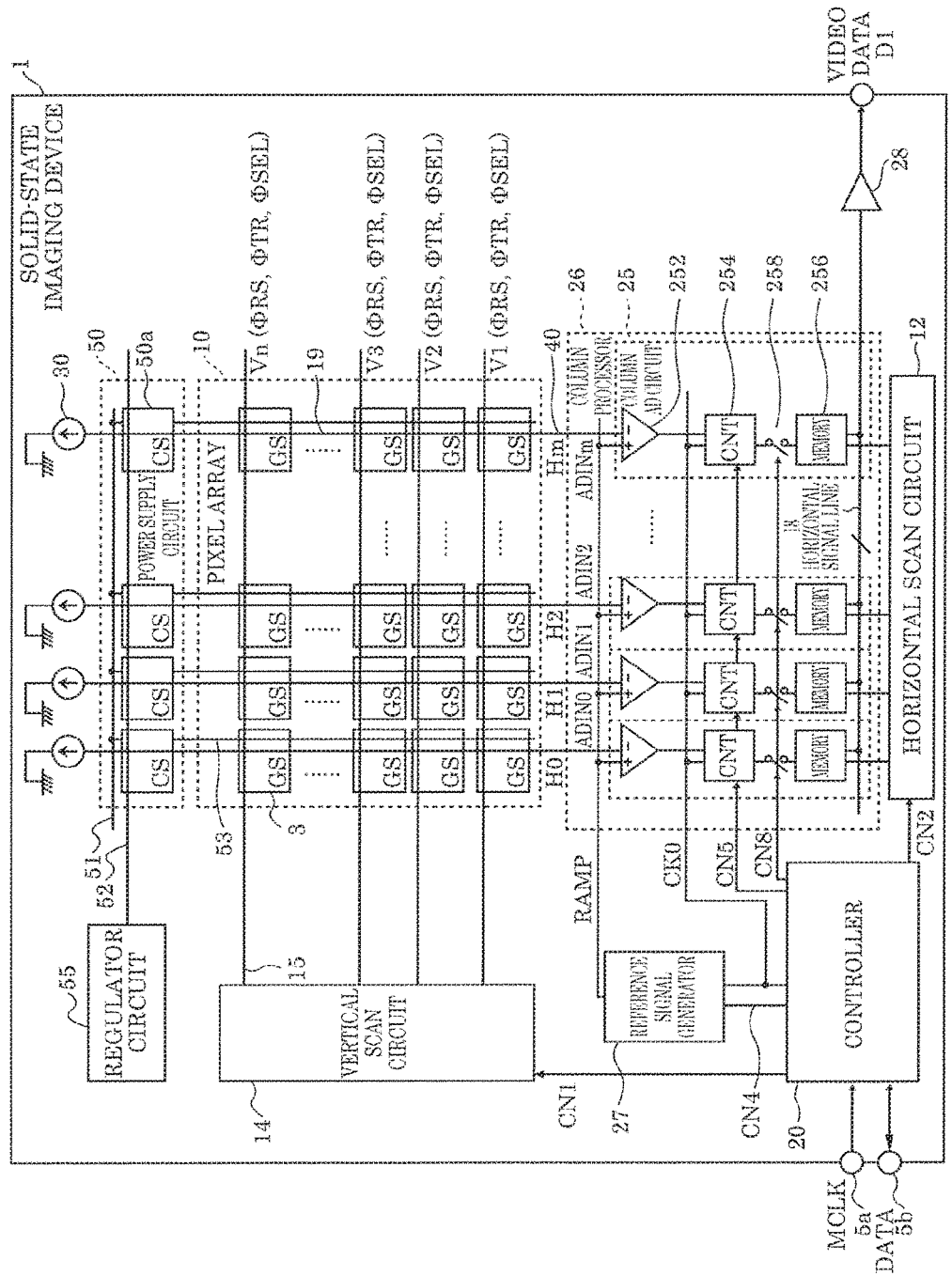
FIG. 1 is a block diagram showing a configuration example of a solid-state imaging device according to Embodiment 1.

FIG. 1 is a block diagram showing a configuration example of solid-state imaging device 1 according to Embodiment 1. Solid-state imaging device 1 shown in the diagram includes pixel array 10, horizontal scan circuit 12, vertical scan circuit 14, a plurality of vertical signal lines 19, controller 20, column processor 26, reference signal generator 27, output circuit 28, a plurality of load current sources 30, power supply circuit 50, and regulator circuit 55. Solid-state imaging device 1 also includes MCLK terminal that receives input of a master clock signal from the outside, DATA terminal for transmitting and receiving commands or data to and from the outside, and D1 terminal for transmitting video data to the outside, and also includes in addition thereto, terminals to which a power supply voltage and a ground voltage are supplied.

Pixel array 10 includes a plurality of pixel circuits 3 that are arranged in rows and columns. In FIG. 1, the plurality of pixel circuits 3 are arranged in n rows and m columns.

Horizontal scan circuit 12 sequentially scans memories 256 provided in a plurality of column AD circuits, and thereby outputs analog-to-digital (AD) converted pixel signals to output circuit 28 via horizontal signal line 18.

Vertical scan circuit 14 scans, on a row-by-row basis, horizontal scan line groups 15 (also referred to as row control line groups) that are each provided for each row of pixel circuits 3 in pixel array 10. By doing so, vertical scan circuit 14 selects pixel circuits 3 on a row-by-row basis, and causes pixel circuits 3 belonging to the selected row to simultaneously output a pixel signal to m vertical signal lines 19. The number of horizontal scan line groups 15 is the same as the number of rows of pixel circuits 3. In FIG. 1, n horizontal scan line groups 15 (V1, V2, ..., and Vn in FIG. 1) are provided. Each horizontal scan line group 15 includes reset control line $\Phi RS$, readout control line $\Phi TR$, and select control line $\Phi SEL$.

Vertical signal line 19 is provided for each column of pixel circuits 3 in pixel array 10, and transmits the pixel signal from pixel circuit 3 belonging to the selected row to column AD circuit 25. In FIG. 1, the plurality of vertical signal lines 19 include m vertical signal lines H0 to Hm. Portions of vertical signal lines 19 that are on the downstream of column-switching circuit 50, or in other words, the portions that are connected to minus input terminals of column AD circuits 25 will be referred to as "ADC input lines 40". In FIG. 1, the plurality of ADC input lines 40 include m ADC input lines ADIN0 to ADINm.

Controller 20 performs overall control of solid-state imaging device 1 by generating various types of control signal groups. The various types of control signal groups include control signal groups CN1, CN2, CN5, CN8, CN10, and CN10, and counter clock CK0. For example, controller 20 controls horizontal scan circuit 12, vertical scan circuit 14, and the like by receiving master clock MCLK via terminal 5a and generating various types of internal clocks.

Column processor 26 includes column AD circuits 25 that are each provided for each column. Each column AD circuit 25 AD converts a pixel signal from vertical signal line 19.

Each column AD circuit 25 includes voltage comparator 252, counter 254, and memory 256.

Voltage comparator 252 compares an analog pixel signal from vertical signal line 19 with reference signal RAMP that has a triangular waveform and is generated by reference signal generator 27, and when, for example, the former exceeds the latter, inverts an output signal indicative of the result of comparison.

Counter 254 counts the time from the start of a change in the triangular waveform of reference signal RAMP until when the output signal of voltage comparator 252 is inverted. The time until when the output signal of voltage comparator 252 is inverted depends on the value of the analog pixel signal, and thus the count value amounts to the value of a digitized pixel signal.

Memory 256 stores the count value of counter 254, or in other words, a digital pixel signal.

Reference signal generator 27 generates reference signal RAMP having a triangular waveform, and outputs reference signal RAMP to a plus input terminal of voltage comparator 252 of each column AD circuit 25.

Output circuit 28 outputs the digital pixel signals read out from memories 256 through scanning performed by horizontal scan circuit 12 to video data terminal D1 via horizontal signal line 18.

Load current source 30 is a load circuit that is provided for each vertical signal line 19 and supplies a load current to vertical signal line 19. That is, load current source 30 supplies a load current to the amplifier transistor of selected pixel circuit 3 via vertical signal line 19, and forms a source follower circuit together with the amplifier transistor.

Power supply circuit 50 includes a plurality of unit power supply circuits 50a. Each unit power supply circuit 50a generates a second power supply voltage from a first power supply voltage of first power supply line 51 based on a reference voltage of reference voltage line 52, and supplies the second power supply voltage to the amplifier transistors provided in the plurality of pixel circuits 3. In Embodiment 1, unit power supply circuit 50a is provided for each column of the plurality of pixel circuits 3, and independently supplies the second power supply voltage to the amplifier transistors of pixel circuits 3 belonging to the corresponding column via second power supply line 53.

Regulator circuit 55 generates the above-described reference voltage and supplies the reference voltage to reference voltage line 52.

Configuration Example of Power Supply Circuit

A specific example of power supply circuit 50 and pixel circuits 3 will be described.

Figure 2:
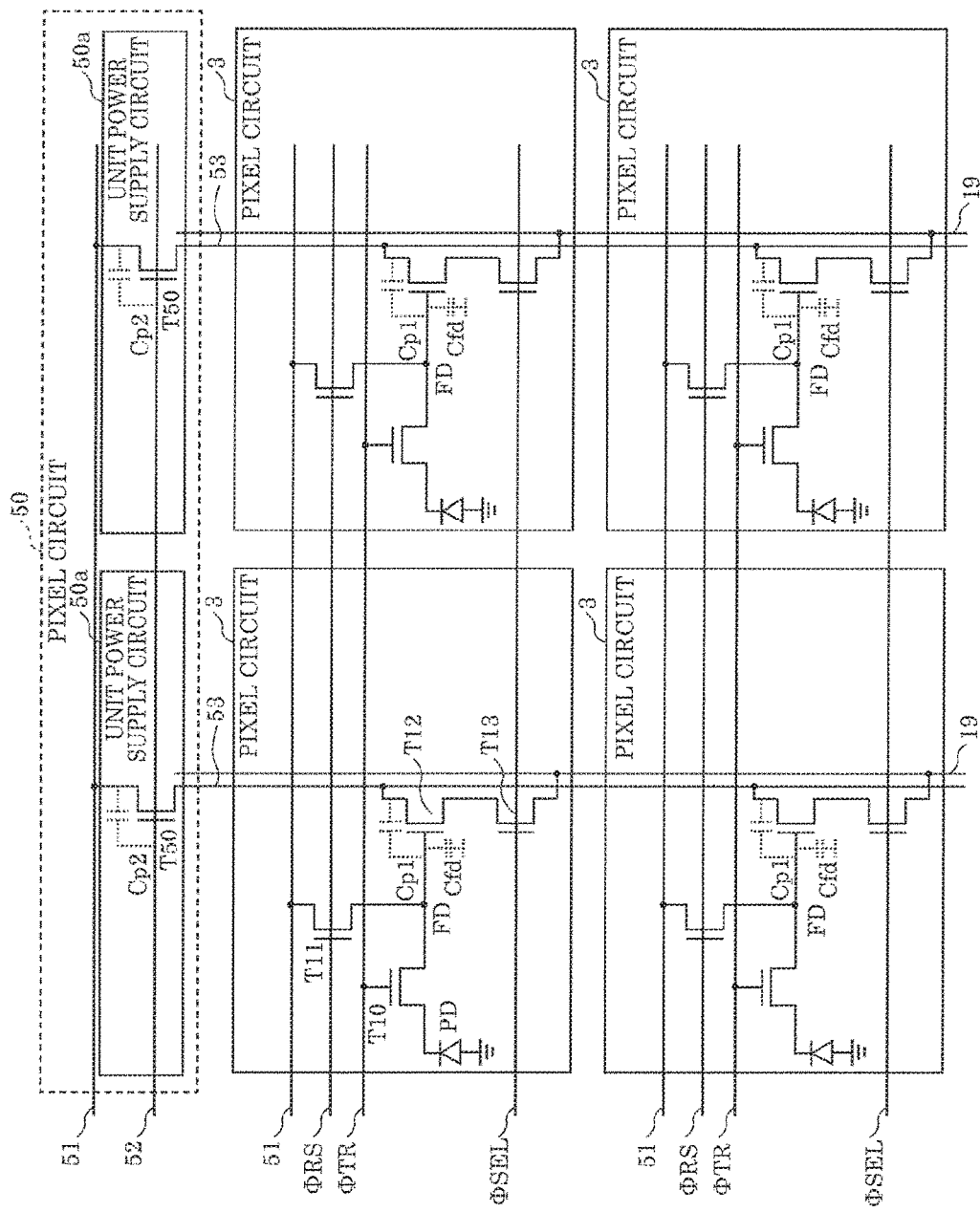
FIG. 2 is a circuit diagram showing a configuration example of a power supply circuit and pixel circuits according to Embodiment 1.

FIG. 2 is a circuit diagram showing a configuration example of power supply circuit 50 and pixel circuits 3 according to Embodiment 1. In this diagram, for the sake of convenience, power supply circuit 50 and pixel circuits 3 arranged in two rows and two columns are shown.

Power supply circuit 50 includes a plurality of unit power supply circuits 50a. Each unit power supply circuit 50a is provided for each column of pixel circuits.

Each unit power supply circuit 50a includes NMOS transistor T50. Transistor T50 is cascode connected to amplifier transistors T12 of pixel circuits 3 belonging to the same column via second power supply line 53.

Reference voltage line 52 is connected to a gate terminal of transistor T50, and a reference voltage is supplied to transistor T50 from regulator circuit 55 via reference voltage line 52. The voltage of the reference voltage may be slightly higher than that of the first power supply voltage.

First power supply line 51 is connected to a drain terminal of transistor T50, and a first power supply voltage of first power supply line 51 is supplied to transistor T50.

A source terminal of transistor T50 is connected to second power supply line 53 so as to output the second power supply voltage, and is connected to drain terminals of the amplifier transistors of pixel circuits 3 belonging to the same column.

The reference voltage is determined such that transistor T50 constituting unit power supply circuit 50a and amplifier transistor T12 operate in a saturated region. That is, the first power supply voltage, the second power supply voltage, and the reference voltage are set such that transistor T50 and amplifier transistor T12 operate in a region in which drain-to-source voltage VDS in transistor T50 and amplifier transistor T12 is greater than or equal to a value obtained by subtracting threshold voltage Vt from gate-to-source voltage VGS. The reason that these voltages are set such that transistor T50 operates in a saturated region is to increase the impedance between the drain terminal and the source terminal. As a result of transistor T50 operating in a saturated region, the second power supply voltage is less likely to be influenced by variation in the first power supply voltage, and thus the influence of external power supply noise can be reduced.

Each pixel circuit 3 includes photodiode PD that is a pixel (light receiver), floating diffusion layer FD, readout transistor T10, reset transistor T11, amplifier transistor T12, and select transistor T13.

Photodiode PD is a light receiving element that performs photoelectric conversion and generates electric charges according to the amount of light received.

Floating diffusion layer FD temporarily stores the electric charges read out from photodiode PD via readout transistor T10.

Readout transistor T10 reads out (or in other words transfers) the electric charges from photodiode PD into floating diffusion layer FD in accordance with a readout control signal of readout control line ΦTR.

Reset transistor T11 resets the electric charges in floating diffusion layer FD in accordance with a reset control signal of reset control line ΦRS. A drain terminal of reset transistor T11 is connected to first power supply line 51 so as to eliminate even a slight voltage drop and ensure utmost signal level of floating diffusion layer FD.

Amplifier transistor T12 converts the electric charges in floating diffusion layer FD to a voltage, performs amplification, and outputs the amplified signal to vertical signal line 19 via select transistor T13 as a pixel signal. Amplifier transistor T12 receives supply of power from an output terminal of unit power supply circuit 50a.

Select transistor T13 selects whether or not to output the pixel signal of amplifier transistor T12 to vertical signal line 19 in accordance with a select control signal of select control line ΦSEL.

FIG. 2 shows an example of pixel circuits 3 having a so-called one-pixel one-cell structure, but pixel circuits 3 may have a so-called multiple-pixel one-cell structure. Multiple-pixel one-cell structured pixel circuits 3 may each include, for example, a plurality of photodiodes PD, and may be configured such that any one or all of floating diffusion layer FD, reset transistor T11, amplifier transistor T12, and select transistor T13 are shared in a unit cell.

Configuration Example of Regulator Circuit

Next, a configuration example of regulator circuit 55 will be described.

Figure 3:
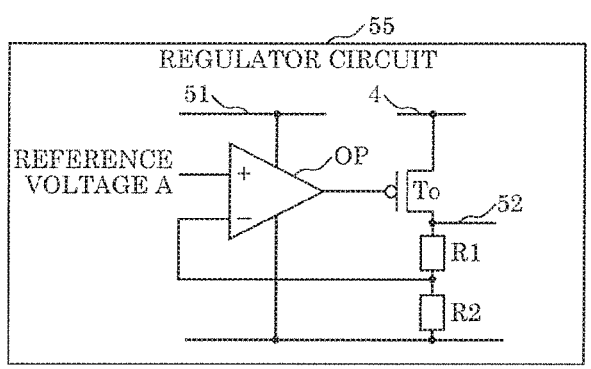
FIG. 3 is a circuit diagram showing a configuration example of a regulator circuit according to Embodiment 1.

FIG. 3 is a circuit diagram showing a configuration example of regulator circuit 55. Regulator circuit 55 shown in the diagram includes operational amplifier OP, output transistor To, and load resistors R1 and R2.

Output transistor To receives supply of boost voltage 4 having a voltage higher than that of the first power supply voltage.

Operational amplifier OP operates at the first power supply voltage of first power supply line 51, detects an error between reference voltage A and a feedback signal generated by voltage division between load resistors R1 and R2, and controls a gate terminal of output transistor To such that the error is reduced to zero.

The reference voltage that is output from output transistor To to reference voltage line 52 is generated based on GND. For this reason, it has a feature that even if the first power supply voltage and boost voltage 4 vary, the effect of suppressing variation is very high. Here, the stability of the reference voltage of reference voltage line 52 can be further increased by, for example, connecting an external capacitance. In this way, regulator circuit 55 outputs a constant reference voltage to power supply circuit 50 via reference voltage line 52.

[Operations of Solid-State Imaging Device]

Hereinafter, a description will be given of operations of solid-state imaging device 1 configured as described above.

Figure 4:
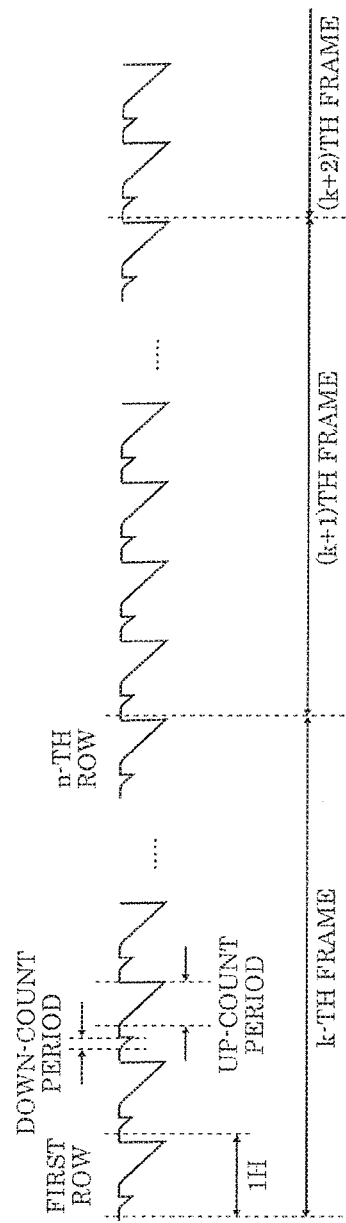
FIG. 4 is a time chart showing an example of operations of the solid-state imaging device according to Embodiment 1 over a plurality of frame periods.
Figure 5:
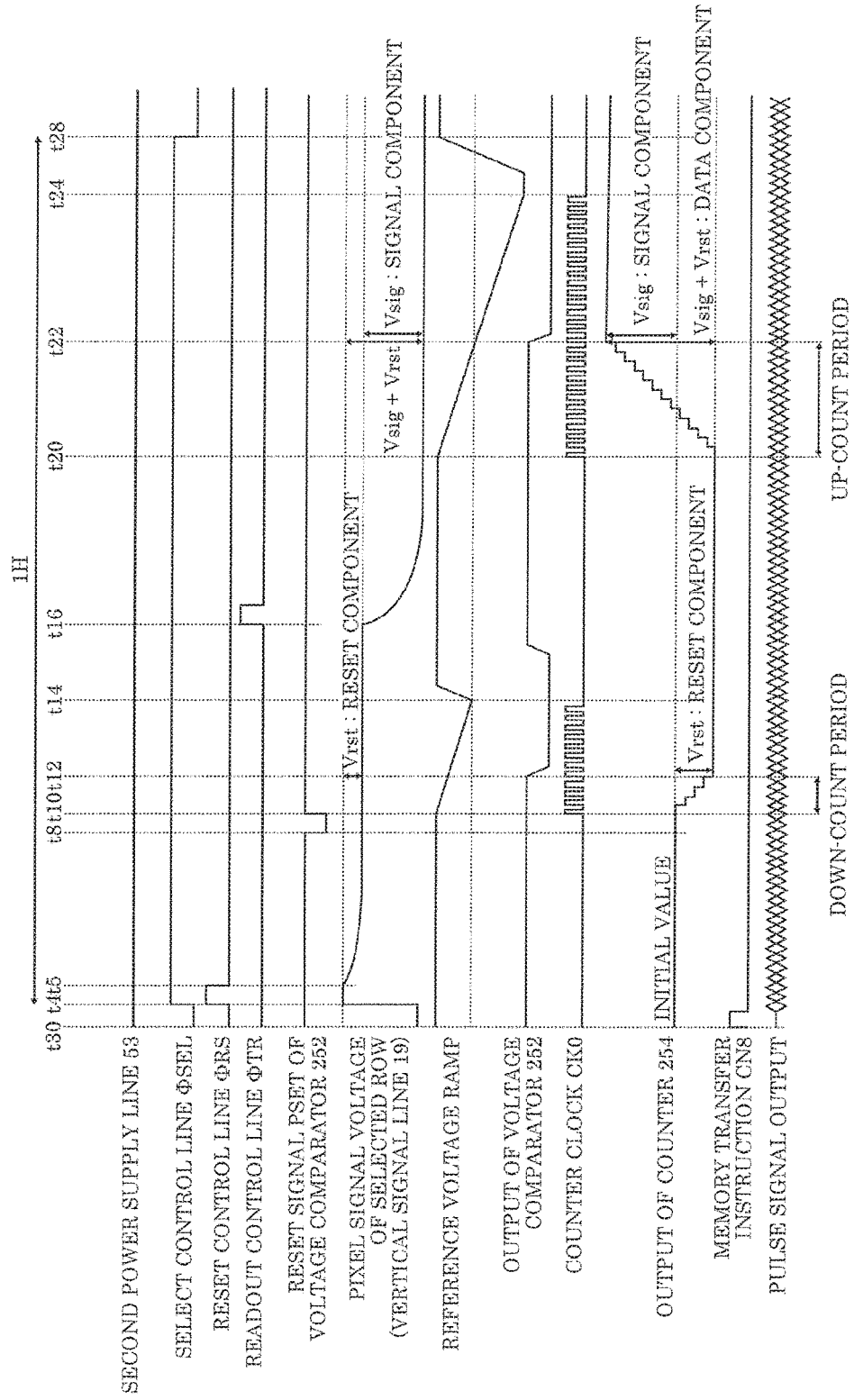
FIG. 5 is a time chart showing an example of operations of the solid-state imaging device according to Embodiment 1 during one horizontal scan period.

FIG. 4 is a time chart showing an example of operations of solid-state imaging device 1 over a plurality of frame periods. In this diagram, the waveform of reference signal RAMP in the k-th to (k+2)th frames is schematically shown. One frame is composed of n horizontal scan periods (period 1H shown in the diagram) corresponding to the first to n-th rows of pixel circuits 3. FIG. 5 is a time chart showing an example of operations of the solid-state imaging device during one horizontal scan period.

In each horizontal scan period, reference signal RAMP has a triangular waveform during a down-count period and an up-count period in FIGS. 4 and 5.

The down-count period is a period during which a first pixel signal indicative of the level of reset component Vrst that is output from amplifier transistor T12 is AD converted. Counter 254 counts down the time from the start of a down-count period (the start of a change in the triangular waveform) until when the output of voltage comparator 252 is inverted. The count value is the result of AD conversion of analog reset component Vrst.

The up-count period is a period during which a second pixel signal indicative of the level of a data component (signal component Vsig+reset component Vrst) that is output from amplifier transistor T12 is AD converted. Counter 254 counts up the time from the start of an up-count period (the start of a change in the triangular waveform) until when the output of voltage comparator 252 is inverted. During the up-count period, an analog data component (Vsig+Vrst) is converted to a digital value. The down-count value indicative of reset component Vrst is set as the initial value during the up-count period, and thus the count value at the end of the up-count period represents the result of correlated double sampling (CDS) in which reset component Vrst is subtracted from the data component (Vsig+Vrst). That is, the count value at the end of the up-count period is signal component Vsig. As described above, column AD circuit 25 eliminates column nonuniformities in clock skew and counter delay that can cause errors, and extracts only true signal component Vsig, or in other words, performs digital CDS.

A single frame of image is obtained by sequentially performing the operations as described above during one horizontal scan period.

Next, operations shown in FIG. 5 will be described by using a comparative reference example in which power supply circuit 50 is not provided.

Figure 6:
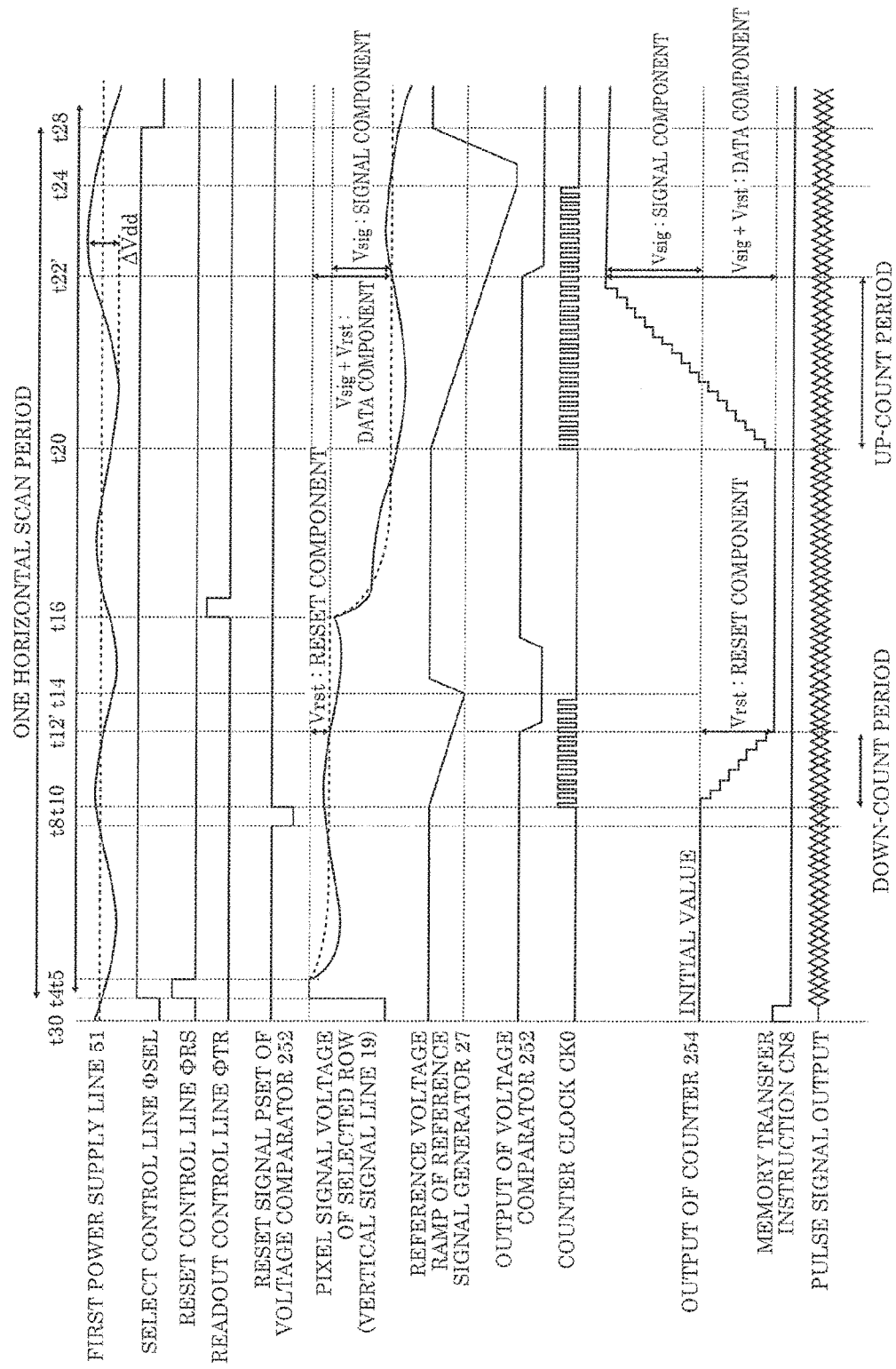
FIG. 6 is a time chart showing an example of operations of a solid-state imaging device according to a comparative example during one horizontal scan period.

FIG. 6 is a time chart showing an example of operations of a solid-state imaging device according to a comparative reference example performed during one horizontal scan period. The diagram shows a time chart of a solid-state imaging device that does not include power supply circuit 50 and regulator circuit 55 shown in FIG. 1 and in which first power supply line 51 and second power supply line 53 are directly connected.

In the comparative reference example shown in FIG. 6, variation $\Delta Vdd$ of first power supply line 51 is schematically illustrated.

When the first power supply voltage varies, the potential of floating diffusion layer FD varies in conjunction with the variation due to a parasitic component such as Cgd of amplifier transistor T12. In this case, because power supply circuit 50 is not provided, pixel output variation cannot be suppressed, and it is not possible to avoid a situation in which noise is introduced commonly to all columns. Under the environment where the power supply varies significantly, horizontal line noise occurs due to the variation of power supply, resulting in a significant image quality degradation.

Hereinafter, this will be described below in detail.

Voltage comparator 252 compares a signal input from vertical signal line 19 with reference signal RAMP that is a ramp waveform output from reference signal generator 27, and AD converts the input signal by counter 254 measuring the time required for voltage comparator 252 to perform comparison and inversion.

Here, voltage comparator 252 undergoes a large current change while voltage comparator 252 performs comparison and inversion. As a result, a potential change occurs in the comparator power supply voltage. However, if a capacitor as disclosed in PTL 1 is provided between the power supply voltage of voltage comparator 252 and the output of voltage comparator 252, the gate-to-source voltage of a source-grounded amplifier circuit in a subsequent stage can be maintained, and it is possible to prevent the result of comparison performed by voltage comparator 252 from varying due to the potential change in the power supply voltage of voltage comparator 252. In the commonly used solid-state imaging device, however, due to, for example, parasitic capacitance Cgd of amplifier transistor T12, a parasitic capacitance between floating diffusion layer FD and the power supply voltage line, and the like, floating diffusion layer FD has parasitic capacitance Cp1 with respect to the power supply voltage line.

Also, if the potential of the first power supply voltage has variation $\Delta Vdd$ due to disturbance noise such as power supply noise, the potential of floating diffusion layer FD also varies at a rate determined by the ratio between parasitic capacitance Cp1 of floating diffusion layer FD and parasitic capacitance Cfd. That is, the variation in floating diffusion layer FD is introduced into a signal transferred from photodiode PD and causes an image quality degradation.

The disturbance noise will be described in further detail. In pixel circuit 3, parasitic capacitance Cp1 is present as a drain-to-gate capacitance between the drain electrode and the gate electrode of amplifier transistor T12 due to gate overlap capacitance and interconnection parasitic capacitance.

Here, if the first power supply voltage varies at a period different from that of a pixel signal readout period, the variation is transmitted as noise to floating diffusion layer FD via parasitic capacitance Cp1 that is the drain-to-gate capacitance, the pixel signal readout period being a period during which amplifier transistor T12 outputs the reset potential of floating diffusion layer FD as a reset level to vertical signal line 19, and further outputs, to vertical signal line 19, the potential of floating diffusion layer FD to which signal electric charges have been transferred, as a signal level.

Accordingly, as shown in FIG. 6, noise is propagated to vertical signal line 19 by amplifier transistor T12, causing an image quality degradation.

Noise $\Delta Vn$ that is output to vertical signal line 19 can be expressed by the following equation, where the voltage variation of first power supply line 51 is represented by $\Delta Vdd$, the total capacitance of floating diffusion layer FD is represented by Cfd, and the gain of amplifier transistor T12 is represented by GSF.

$$\Delta Vn = Cp1/(Cfd+Cp1) \times \Delta Vdd \times GSF \quad \text{(Equation 1)}$$

The variation in floating diffusion layer FD described above is output to vertical signal line 19, and then input into voltage comparator 252.

At this time, for example, the capacitor disclosed in PTL 1 is effective for the variation of the power supply voltage of voltage comparator 252, but the noise caused by variation in the first power supply voltage of pixel circuit 3 cannot be distinguished from the signal (image signal) output from the same pixel circuit 3. Accordingly, it is not possible to remove the noise.

That is, with the commonly used solid-state imaging device according to the comparative reference example, even if the capacitor of PTL 1 is used, it is not possible to suppress an image quality degradation caused by disturbance noise such as power supply noise.

Unlike the comparative reference example shown in FIG. 6, in solid-state imaging device 1 according to the present embodiment, unit power supply circuit 50a is provided for each column. If a power supply interconnection is directly connected commonly to all columns as disclosed in PTL rather than unit power supply circuits 50a being provided for each column, the following problem arises. For example, if a high illumination intensity signal is input into a column, the voltage of vertical signal line 19 varies significantly, and the load current of load current source 30 varies. As a result, the power supply voltage of the column varies. Accordingly, the power supply noise sneaks into the power supply voltage of other columns to exert influence, and sneaks into floating diffusion layer FD via parasitic capacitance Cp1. As a result, power supply noise deteriorates.

In contrast, in Embodiment 1, the output terminals of unit power supply circuit 50a of power supply circuit 50 are independently connected for each column, and thus, there is the effect of eliminating the influence of current variation of other columns in which AD conversion is performed.

Where the variation of the second power supply voltage of Embodiment 1 is represented by ΔVdd, the total capacitance of floating diffusion layer FD is represented by Cfd, and the gain of amplifier transistor T12 is represented by GSF, as shown in FIG. 5, the second power supply voltage of second power supply line 53 is not affected. That is, because ΔVdd=0, noise ΔVn that is output to vertical signal line 19 is expressed as follows.

$$\Delta Vn = Cp1/(Cfd + Cp1) \times \Delta Vdd \times GSF \quad \text{(Equation 2)}$$
$$= 0$$

As described above, the second power supply voltage is stable, the pixel signal transmitted through vertical signal line 19 is stabilized, and thus there is the effect of reducing the influence of the noise in the first power supply voltage.

In the present embodiment, power supply circuit 50 is output outside pixel array 10 including pixel circuits 3, and thus the characteristics of pixel circuits 3 are not affected.

As described above, the second power supply voltage shown in FIG. 5 is smoothed and stabilized. Because the second power supply voltage is stable, the pixel signal voltage transmitted through vertical signal line 19 is stabilized, and there is the effect of removing noise in the first power supply voltage.

Hereinafter, operations of solid-state imaging device 1 that are shown in FIG. 5 will be described.

First, for a first readout operation, controller 20 causes counters 254 to reset their count value to a set initial value, and sets counters 254 in a down-count mode. The initial value of the count value may be "0", or may be any other value.

Next, at time t4, selected row Vx is selected by select control line ΦSEL being brought to a high level to turn on select transistors T13 of pixel circuits 3.

Next, in a state in which readout control line ΦTR is at a low level and readout transistors T10 are off, at time t4, reset control line ΦRS is brought to a high level to turn on reset transistors T11, and the voltage of floating diffusion layers FD of pixel circuits 3 are reset to the first power supply voltage.

Next, after a predetermined period of time elapses, in a state in which the voltage of floating diffusion layers FD is reset, reset control line ΦRS is brought to a low level to turn off reset transistors T11.

Then, the voltage of floating diffusion layers FD of pixel circuits 3 is amplified by amplifier transistors T12, and reset component VRSt is read out via vertical signal lines 19. In this state, the noise component from the first power supply voltage has been removed.

During the down-count period, controller 20 supplies, to reference signal generator 27, control signal CN4 for generating reference signal RAMP. Upon receiving the control signal, reference signal generator 27 inputs reference signal RAMP having a triangular waveform that has been changed over time to have a ramp as a comparative voltage into input terminals (+) of voltage comparators 252. Voltage comparators 252 compare the voltage of reference signal RAMP with a voltage indicating a reset component (VRSt) transmitted from ADC input line 40 (ADINx) of each column and from which the noise component from the first power supply voltage has been removed.

Also, concurrently with the start of a change in the triangular waveform of reference signal RAMP that is input to input terminals (+) of voltage comparators 252, in order for counters 244 provided for each column to measure a comparison time of voltage comparator 252, count clock CK0 is input into clock terminals of counters 254 from controller 20 in sync with a ramp waveform voltage output from reference signal generator 27 (at time t10), and counters 254 start counting down from the set initial value as a first count operation.

Also, voltage comparators 252 compare reference signal RAMP from reference signal generator 27 with the pixel reset component voltage (VRSt) of selected row Vx input via ADC input line 40, and when the two voltages are brought equal to each other, invert the output of voltage comparators 252 from a high level to a low level (at time t12). That is, by comparing the voltage corresponding to reset component VRSt with reference signal RAMP and counting (measuring) a magnitude in the time axis direction corresponding to the magnitude of reset component VRSt by using count clock CK0, a count value corresponding to the magnitude of reset component VRSt can be obtained. In other words, counters 254 obtain a count value corresponding to the magnitude of reset component VRSt by performing down count from the start of a change in the triangular waveform of reference signal RAMP, which is the time for counter 254 to start counting down, until when the output of voltage comparators 252 is inverted.

Also, after a predetermined down-count period elapses (t14), controller 20 stops the supply of control data to voltage comparators 252 and the supply of count clock CK0 to counters 254. As a result, voltage comparators 252 stop generation of the triangular waveform of reference signal RAMP.

In the first readout operation, the count operation is performed upon reset component VRSt in the pixel signal voltage of selected row Vx being detected by voltage comparators 252, which means reset component VRSt of pixel circuits 3 is read out.

In this way, operations are performed such that the output signals of vertical signal line 19 are read out by column AD circuits 25 that are CDS (at time t14).

Then, when the AD conversion of the pixel reset component ends, then, a second pixel signal readout operation starts. In the second readout operation, an operation of reading out, in addition to reset component VRSt, signal component Vsig according to the amount of incident light per pixel circuit 3 is performed. A difference from the first readout operation is to set counters 254 in an up-count mode.

To be specific, at time t16, readout control line ΦTR is brought to a high level to turn on readout transistors T10, and all photo-charges accumulated in photodiodes PD are transmitted to floating diffusion layers FD. After that, readout control line ΦTR is brought to a low level to turn off readout transistors T10.

Then, a data component (VRSt+Vsig) of amplifier transistors T12 is read out via vertical signal lines 19.

At this time as well, in the same manner as described above, in this state, the noise component from the first power supply voltage is removed. At this time, counters 254 performs up count.

During the up-count period, reference signal RAMP that has been changed step-wise over time to have a ramp is input by reference signal generator 27, which is compared with the pixel signal component voltage of selected row Vx input via ADC input line 40 of each column by voltage comparator 252.

At this time, concurrently with the input of reference signal RAMP to input terminals (+) of voltage comparators 252, in order to measure a comparison time of voltage comparators 252 by using counters 24, counters 24 start counting up from the count value at which the down-count operation stopped in sync with the ramp waveform voltage emitted from reference signal generator 27 (at time t20) as a second count operation.

Also, voltage comparators 252 compare reference signal RAMP having a ramp from reference signal generator 27 with a data component (VRSt+Vsig) of the pixel signal component of selected row Vx input via ADC input line 40 of each column, and when the two voltages are brought equal to each other, invert the comparator output from a high level to a low level (at time t22).

In this way, operations are performed such that the output signals of vertical signal lines 19 are read out by column AD circuits 25 that are CDS (at time t24).

That is, by comparing the voltage signal corresponding to the data component (VRSt+Vsig) with reference signal RAMP, and counting (measuring) a magnitude in the time axis direction corresponding to the magnitude of signal component Vsig by using count clock CK0, a count value corresponding to the magnitude of signal component Vsig can be obtained. In other words, counters 254 obtain a count value corresponding to the magnitude of the data component (VRSt+Vsig) by performing up count from the start of a change in the triangular waveform of reference signal RAMP, which is the time for counter 254 to start counting up, until when the output of voltage comparator 252 is inverted. In this way, digital CDS is performed by, for example, setting counters 254 in the down-count mode when reading out reset component (VRSt), and setting counters 254 in the up-count mode when reading out the data component (VRSt+Vsig), whereby subtraction is automatically performed in counters 254 to obtain a count value corresponding to signal component Vsig.

Then, AD converted data (signal component Vsig) is stored in memories 256. That is, before counters 254 start operation (at time t30), the count result of previous row Vx−1 is transferred from controller 20 to memories 256 based on memory transfer instruction pulse control signal CN8.

Through the processing described above, column AD circuits 25 execute digital CDS when all pixels of row Vx are read out.

As described above, with solid-state imaging device 1 according to Embodiment 1, as shown in FIG. 4, one horizontal scan period during which pixel circuits 3 of row Vx are read out is composed of a down-count period and an up-count period during each of which AD conversion is performed. By executing the horizontal scan period for each row, a single frame of video data is output to video data terminal D1.

As described above, in the present embodiment, by providing unit power supply circuits 50a for each column, it is possible to reduce the influence of power supply noise of first power supply line 51 particularly when the pixel signal varies, and improve noise and the like superimposed on amplifier transistors T12 in pixel circuits 3.

Hereinafter, the solid-state imaging device according to Embodiment 1 will be further summarized and described.

Solid-state imaging device 1 according to the present embodiment includes: a plurality of pixel circuits 3 that are arranged in rows and columns; a plurality of unit power supply circuits 50a that generate a second power supply voltage from a first power supply voltage based on a reference voltage and supply the second power supply voltage to amplifier transistors T12 provided in the plurality of pixel circuits 3; and regulator circuit 55 that generates the reference voltage that is constant. Each of unit power supply circuits 50a is provided for each of the columns of the plurality of pixel circuits 3 or for each of pixel circuits 3, and supplies the second power supply voltage to the amplifier transistors in pixel circuits 3 that belong to a corresponding column or to the amplifier transistor in a corresponding pixel circuit.

With this configuration, even if the first power supply voltage is an externally supplied power supply and external noise is superimposed on the first power supply voltage, the unit power supply circuits stably supply the second power supply voltage so as to reduce the noise, and thus the image quality degradation caused by variation of the first power supply voltage can be reduced. Furthermore, because the power supply lines of the second power supply voltage connected to the pixel circuits are provided independently for each column or for each pixel circuit by the unit power supply circuits, the possibility that noise generated inside sneaks between columns is reduced, and thus an image quality degradation (for example, horizontal line noise) caused by noise sneaking between columns can be reduced.

Here, each of the plurality of pixel circuits 3 includes: photodiode PD that generates electric charges according to the amount of light received; floating diffusion layer FD that accumulates the electric charges; readout transistor T10 that reads out the electric charges from photodiode PD to floating diffusion layer FD; reset transistor T11 that resets floating diffusion layer FD; amplifier transistor T12 that converts the electric charges in floating diffusion layer FD to a voltage and amplifies the voltage; and select transistor T13 that selects whether or not to output an output of amplifier transistor T12 to vertical signal line 19. The first power supply voltage is supplied to the drain terminal of reset transistor T11.

With this configuration, reset transistor T11 receives supply of the first power supply voltage, and thus the second power supply voltage is less likely to be influenced by noise (variation in power supply) that may occur due to the operation of reset transistor T11. The possibility that noise generated inside by the operation of reset transistor T11 sneaks into other columns is reduced, and thus the image quality degradation caused by noise sneaking between columns can be reduced.

Here, unit power supply circuits 50a are each provided for each of the columns of the plurality of pixel circuits 3, and each of unit power supply circuits 50a includes transistor T50 connected to amplifier transistors T12 provided in pixel circuits 3 belonging to the same column, the reference voltage is supplied to the gate terminal of transistor T50, the first power supply voltage is supplied to the drain terminal of transistor T50, the source terminal of transistor T50 outputs the second power supply voltage and is connected to the drain terminal of amplifier transistors T12 belonging to the same column, and transistor T50 operates in a saturated region.

With this configuration, by increasing the impedance between the drain terminal and the source terminal of transistor T50, it is possible to not only prevent the variation of the first power supply voltage from affecting the second power supply voltage, but also reduce the possibility that the noise generated inside sneaks between columns. Furthermore, the possibility that the noise sneaks between rows is also reduced, and thus the image quality degradation can be further reduced. With a simple configuration of unit power supply circuit 50a composed of one transistor T50, unnecessary sneaking of power supply noise can be eliminated, and noise characteristics of imaging at in particular a low illumination intensity such as an important infrared camera can be improved.

Embodiment 2

In Embodiment 2, an example of solid-state imaging device 1 in which unit power supply circuit 50a is provided for each pixel circuit 3 instead of for each column will be described.

Figure 7:
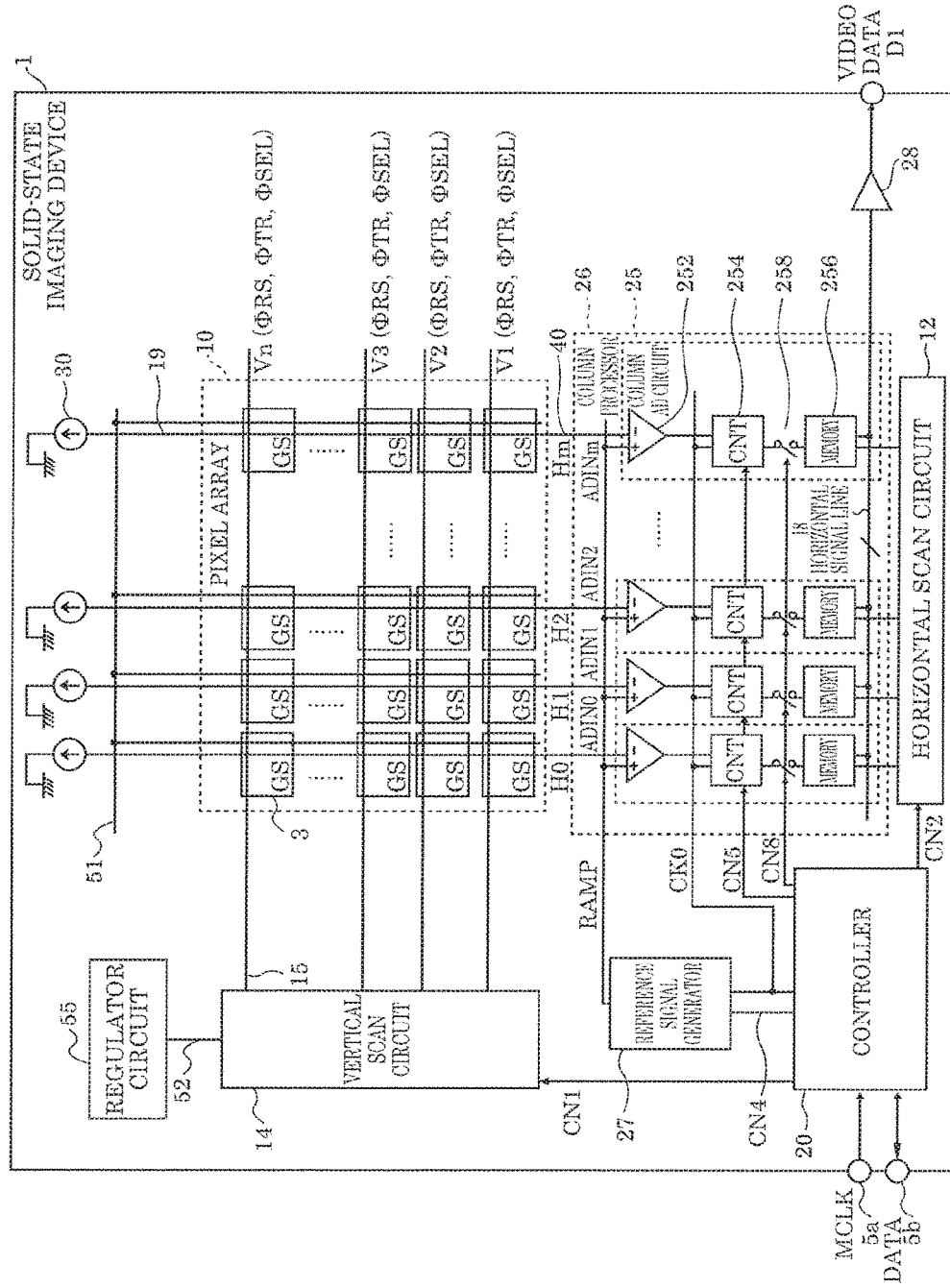
FIG. 7 is a block diagram showing a configuration example of a solid-state imaging device according to Embodiment 2.

FIG. 7 is a block diagram showing a configuration example of a solid-state imaging device according to Embodiment 2. The diagram is different from FIG. 1 in that unit power supply circuits 50a are each provided for each pixel circuit 3 instead of for each column, and the reference voltage is indirectly supplied from regulator circuit 55 to unit power supply circuits 50a via vertical scan circuit 14, instead of being directly supplied from regulator circuit 55 to unit power supply circuits 50a. The following description will be given focusing on the differences.

Figure 8:
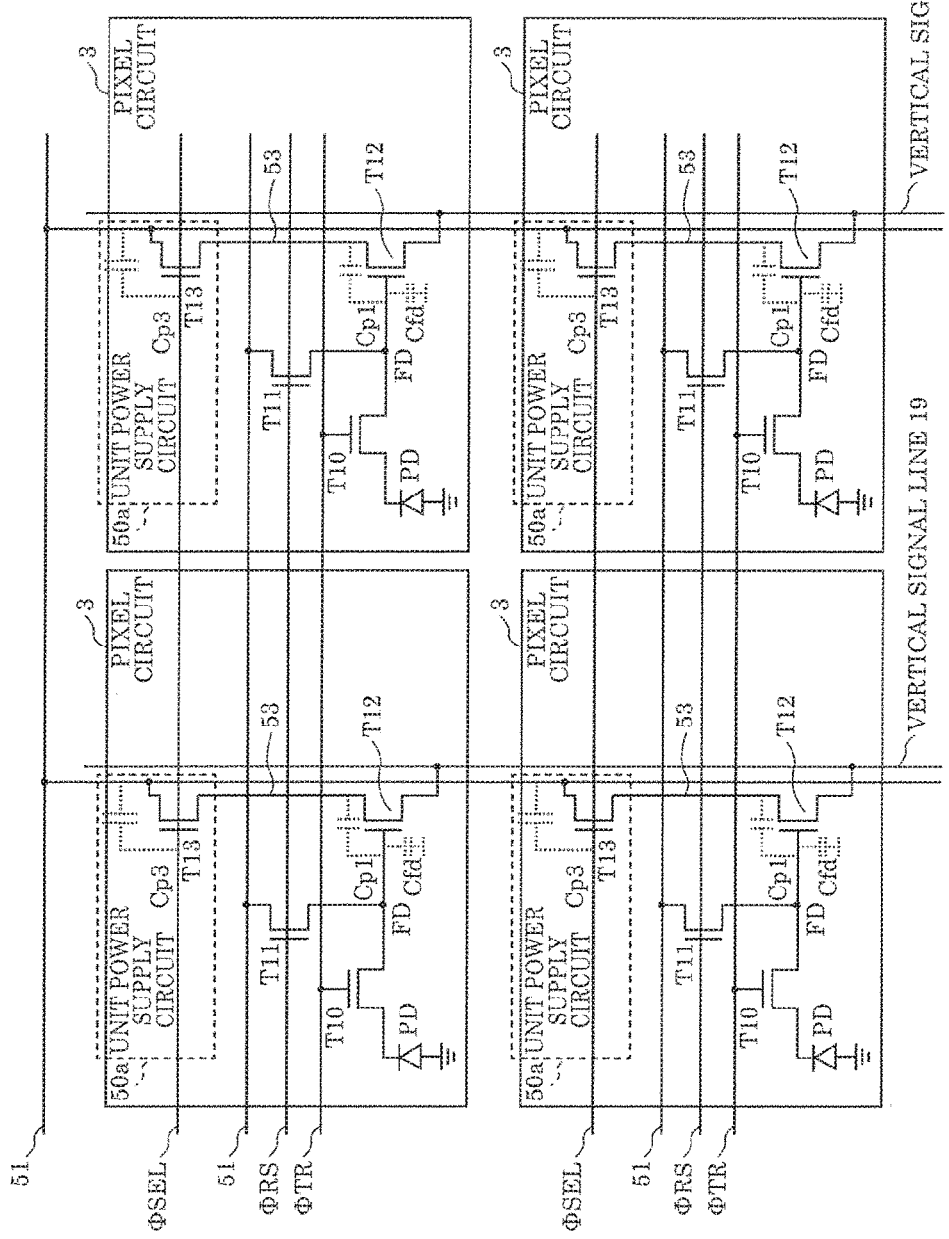
FIG. 8 is a circuit diagram showing a configuration example of unit power supply circuits and pixel circuits according to Embodiment 2.

Unit power supply circuits 50a are configured, for example, as shown in FIG. 8.

FIG. 8 is a diagram showing a configuration example of unit power supply circuits 50a and pixel circuits 3 according to Embodiment 2. Pixel circuits 3 shown in the diagram are different from those shown in FIG. 2 in that the order of cascode connection of select transistors T13 and amplifier transistors T12 is reversed between second power supply line 53 (or first power supply line 51) and vertical signal lines 19, and select transistors T13 each have two functions: functioning as a select transistor of pixel circuit 3 and functioning as unit power supply circuit 50a (or in other words, transistor T50 shown in FIG. 2). The following description will be given focusing on the differences.

In FIG. 8, unit power supply circuits 50a are each provided for each pixel circuit 3. Each unit power supply circuit 50a shares select transistor T13 with pixel circuit 3.

The reason that the order of cascode connection of select transistors T13 and amplifier transistors T12 is reversed from that shown in FIG. 2 is to supply the second power supply voltage from select transistors T13 to amplifier transistors T12.

A select control signal whose high level corresponds to the reference voltage is supplied to a gate terminal of select transistor T13 from select control line ΦSEL.

The first power supply voltage is supplied to a drain terminal of select transistor T13.

A source terminal of select transistor T13 generates the second power supply voltage and supplies the second power supply voltage to the drain terminal of amplifier transistor T12.

Select transistor T13 operates in a saturated region when the select control signal of select control signal line ΦSEL is at the high level (here, the reference voltage).

The drain terminal of reset transistor T11 is connected to first power supply line 51 so as to eliminate even a slight voltage drop and ensure utmost pixel signal level.

Amplifier transistor T12 receives supply of power from an output terminal of cascode connected select transistor T13.

The high level (here, reference voltage) of the select control signal is set such that the transistors constituting power supply circuits 50 and amplifier transistors T12 operate in a saturated region. This can be implemented by making adjustment so as to include the influence of select transistors T13 and threshold voltage Vth of amplifier transistors T12 and the influence due to reduction of the potential of floating diffusion layer FD caused by the influence of Cgs of reset transistors T11 at timing t5 after reset is released, shown in FIG. 5.

For example, threshold voltage Vth of amplifier transistors T12 is often configured as a depletion type for the purpose of noise reduction. In this case, unit power supply circuits 50a, or in other words, select transistors T13 may also be configured as a depletion type. Furthermore, the reference voltage may have a voltage slightly higher than that of the first power supply voltage.

Figure 9:
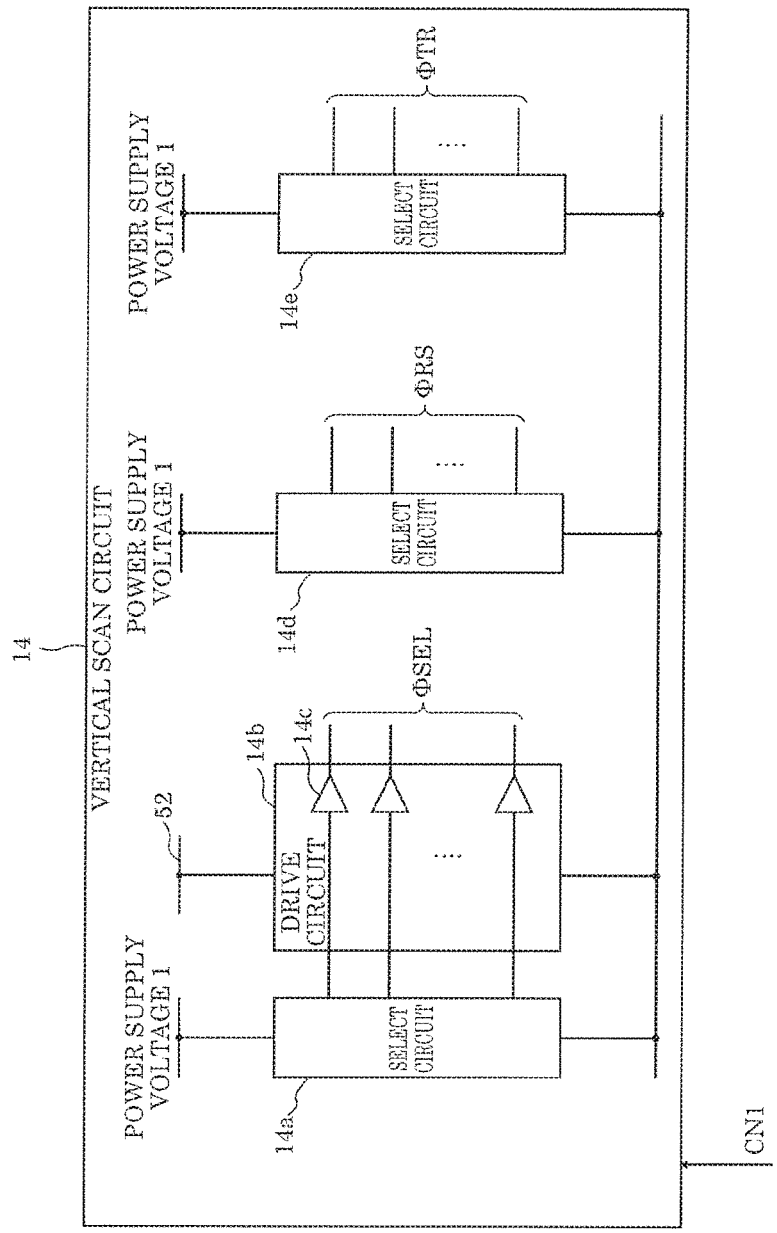
FIG. 9 is a circuit diagram showing a configuration example of a vertical scan circuit according to Embodiment 2.

FIG. 9 is a circuit diagram showing a configuration example of vertical scan circuit 14 according to Embodiment 2. As shown in the diagram, vertical scan circuit 14 includes select circuit 14a, drive circuit 14b, and select circuits 14d and 14e.

Select circuits 14a, 14d and 14e operate at power supply voltage 1 (for example, the first power supply voltage) and respectively generate a select control signal, a reset control signal, and a readout control signal. Among them, select circuits 14d and 14e output the reset control signal and the readout control signal in which power supply voltage 1 is the high level to reset control lines ΦRS and readout control lines ΦTR, respectively.

Drive circuit 14b includes buffers 14c (or drivers) that are each provided for each row and operate at the reference voltage from regulator circuit 55, and converts the voltage level of the select control signal generated by select circuit 14a, or in other words performs conversion to obtain a select control signal whose high level corresponds to the reference voltage, and outputs the signal to select control lines ΦSEL.

With this configuration, the reference voltage of regulator circuit 55 is indirectly supplied to unit power supply circuits 50a via drive circuit 14b provided in vertical scan circuit 14.

If unit power supply circuit 50a is configured to, instead of being provided for each column nor for each pixel circuit 3, supply the second power supply voltage to the amplifier transistors as a common power supply interconnected to all columns, the problem as described in Embodiment 1 arises. That is, if a high illumination intensity signal is input into a column, the voltage of vertical signal line 19 varies significantly, and the load current of load current source 30 varies. As a result, the power supply voltage of the column varies. Accordingly, the power supply noise sneaks into the power supply voltage of other columns to exert influence, and sneaks into floating diffusion layer FD via parasitic capacitance Cp1. As a result, power supply noise deteriorates.

In contrast, in Embodiment 2, the output terminals of unit power supply circuits 50a, that is, the output terminals of select transistors T13 are independently connected for each pixel circuit 3, and thus there is the effect of eliminating the influence of current variation of other columns in which AD conversion is performed.

As in Embodiment 1, where the variation of the first power supply voltage is represented by ΔVdd, the total capacitance of floating diffusion layer FD is represented by Cfd, and the gain of amplifier transistor T12 is represented by GSF, because ΔVdd=0, noise ΔVn that is output to vertical signal line 19 is expressed as follows.

$$\Delta Vn = Cp1/(Cfd + Cp1) \times \Delta Vdd \times GSF \quad \text{(Equation 3)}$$
$$= 0$$

If another transistor is added to pixel circuit 3, there is a possibility that the pixel characteristics may be affected, but in the present embodiment, unit power supply circuit 50a is implemented by select transistor T13, and thus the pixel characteristics are not affected.

As described above, in solid-state imaging device 1 according to the present embodiment, unit power supply circuits 50a are each provided for each pixel circuit 3, each unit power supply circuit 50a shares select transistor T13 with pixel circuit 3, a select control signal whose high level corresponds to the reference voltage is supplied to the gate terminal of select transistor T13, the first power supply voltage is supplied to the drain terminal of select transistor T13, and the source terminal of select transistor T13 generates the second power supply voltage, and is connected to the drain terminal of amplifier transistor T12, and select transistor T13 operates in a saturated region when the select control signal is at the high level.

With this configuration, because unit power supply circuit 50a and pixel circuit 3 share a select transistor, an additional significant increase of the circuit in order to form unit power supply circuit 50a is unnecessary.

Here, a configuration is possible in which a reset control signal (ΦRS) is supplied to the gate terminal of reset transistor T11, a readout control signal (ΦTR) is supplied to the gate terminal of readout transistor T10, and the high level voltage of at least one of the reset control signal (ΦRS) and the readout control signal (ΦTR) is higher than the reference voltage.

With this configuration, it is possible to easily avoid a state in which the reset transistor and the readout transistor are incompletely on.

Here, solid-state imaging device 1 may include vertical scan circuit 14 that supplies a select control signal (ΦSEL) to each row of the plurality of pixel circuits 3, and vertical scan circuit 14 may include select circuit 14a that generates the select control signal indicating either one of selection and non-selection for each row, and drive circuit 14b that outputs the select control signal to select control line ΦSEL provided for each row by driving a high level of the select control signal at the reference voltage.

With this configuration, by providing drive circuit 14b in vertical scan circuit 14, the high level of the select control signal can be used as the reference voltage.

Figure 10:
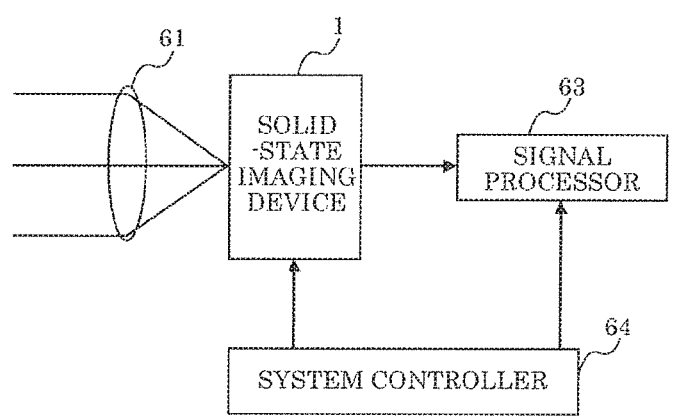
FIG. 10 is a block diagram showing a configuration example of a camera.

Solid-state imaging device 1 described in each embodiment above may be used in a camera. FIG. 10 is a block diagram showing a configuration example of a camera. The camera shown in the diagram includes solid-state imaging device 1, lens 61, signal processor 63, and system controller 64.

Also, solid-state imaging device 1 has a structure in which pixel circuits 3 are formed on the surface of a semiconductor substrate, or in other words, pixel circuits 3 are formed on the same surface as that on which the gate terminals of the transistors and interconnection are formed, but may have a structure of a so-called backside illuminated image sensor (backside illuminated solid-state imaging device) in which pixel circuits 3 are formed on the backside surface of a semiconductor substrate, or in other words, pixel circuit 3 are formed on the back side of the surface on which the gate terminals of the transistors and interconnection are formed.

Although only some exemplary embodiments of the present disclosure have been described in detail above, the scope of the claims of the present application is not limited to the exemplary embodiments given above. Those skilled in the art will readily appreciate that many modifications are possible in the exemplary embodiments, and other embodiments can be obtained by any combination of the structural elements of the exemplary embodiments without materially departing from the novel teachings and advantages of the present disclosure. Accordingly, all such modifications and other embodiments are also intended to be included within the scope of the present disclosure.

INDUSTRIAL APPLICABILITY

The present disclosure is suitable for use in a solid-state imaging device and a camera.

What is claimed is:

1. A solid-state imaging device, comprising:
 a plurality of pixel circuits arranged in rows and columns;
 a plurality of unit power supply circuits that generate a second power supply voltage from a first power supply voltage based on a reference voltage and supply the second power supply voltage to amplifier transistors provided in the plurality of pixel circuits; and
 a regulator circuit that generates the reference voltage that is constant,
 wherein each of the plurality of unit power supply circuits is provided for a corresponding one of the columns of the plurality of pixel circuits or for a corresponding one of the pixel circuits, and supplies the second power supply voltage to the amplifier transistors in the pixel circuits that belong to the corresponding one of the columns or to the amplifier transistor in the corresponding one of the pixel circuits.

2. The solid-state imaging device according to claim 1, wherein each of the plurality of pixel circuits includes:
 a photodiode that generates electric charges according to an amount of light received;
 a floating diffusion layer that accumulates electric charges;

a readout transistor that reads out the electric charges from the photodiode to the floating diffusion layer;
a reset transistor that resets the floating diffusion layer;
the amplifier transistor that converts the electric charges in the floating diffusion layer to a voltage and amplifies the voltage; and
a select transistor that selects whether or not to output an output of the amplifier transistor to a vertical signal line, and
wherein the first power supply voltage is supplied to a drain terminal of the reset transistor.

3. The solid-state imaging device according to claim 2,
wherein each of the plurality of unit power supply circuits is provided for each of the pixel circuits,
wherein each of the plurality of unit power supply circuits shares the select transistor with the pixel circuit,
wherein a select control signal whose high level corresponds to the reference voltage is supplied to a gate terminal of the select transistor,
wherein the first power supply voltage is supplied to a drain terminal of the select transistor,
wherein a source terminal of the select transistor generates the second power supply voltage, and is connected to a drain terminal of the amplifier transistor, and
wherein the select transistor operates in a saturated region when the select control signal is at the high level.

4. The solid-state imaging device according to claim 3,
wherein a reset control signal is supplied to a gate terminal of the reset transistor,
wherein a readout control signal is supplied to a gate terminal of the readout transistor, and
wherein at least one of the reset control signal and the readout control signal has a high level voltage that is higher than the reference voltage.

5. The solid-state imaging device according to claim 3,
wherein the solid-state imaging device includes a vertical scan circuit that supplies the select control signal for each of the rows of the plurality of pixel circuits, and
wherein the vertical scan circuit includes:
a select circuit that outputs the select control signal for each of the rows of the plurality of pixel circuits, the select control signal indicating either one of selection and non-selection; and
a drive circuit that outputs the select control signal to a select control line provided per row by driving the high level of the select control signal at the reference voltage.

6. The solid-state imaging device according to claim 1,
wherein each of the plurality of unit power supply circuits is provided for a corresponding one of the columns of the plurality of pixel circuits,
wherein each of the plurality of unit power supply circuits includes a transistor connected to the amplifier transistors in the pixel circuits that belong to the same column,
wherein the reference voltage is supplied to a gate terminal of the transistor,
wherein the first power supply voltage is supplied to a drain terminal of the transistor,
wherein a source terminal of the transistor outputs the second power supply voltage and is connected to drain terminals of the amplifier transistors that belong to the same column, and
wherein the transistor operates in a saturated region.

7. A camera comprising the solid-state imaging device according to claim 1.

* * * * *